(12) United States Patent
Xiang

(10) Patent No.: US 11,044,990 B2
(45) Date of Patent: Jun. 29, 2021

(54) ELECTRIC LIFT TABLE CONTROL SYSTEM AND METHOD FOR RESISTANCE BACK-OFF

(71) Applicant: Loctek Inc., Livermore, CA (US)

(72) Inventor: Lehong Xiang, Ningbo (CN)

(*) Notice: Subject to any disclaimer, the term of this patent is extended or adjusted under 35 U.S.C. 154(b) by 0 days.

(21) Appl. No.: 16/520,132

(22) Filed: Jul. 23, 2019

(65) Prior Publication Data
US 2020/0329860 A1     Oct. 22, 2020

(30) Foreign Application Priority Data
Apr. 18, 2019  (CN) .......................... 201910313288.0

(51) Int. Cl.
*A47B 9/00* (2006.01)

(52) U.S. Cl.
CPC ........ *A47B 9/00* (2013.01); *A47B 2200/0056* (2013.01); *A47B 2200/0062* (2013.01)

(58) Field of Classification Search
CPC .............. A47B 9/00; A47B 2200/0056; A47B 2200/0058; A47B 2200/006; A47B 2200/0062; A47B 2200/0066
USPC ........................... 108/145, 147, 50.01, 50.02
See application file for complete search history.

(56) References Cited

U.S. PATENT DOCUMENTS

| | | | | |
|---|---|---|---|---|
| 6,352,037 B1* | 3/2002 | Doyle | ...................... | A47B 9/00 108/147 |
| 8,947,215 B2* | 2/2015 | Mandel | ................ | G06Q 10/109 108/147 |
| 10,691,108 B1* | 6/2020 | Labrosse | .................. | G09B 5/06 |
| 2005/0012430 A1* | 1/2005 | Bastholm | ................. | A47B 9/20 310/311 |
| 2005/0187712 A1* | 8/2005 | Callaghan | ............. | B66B 5/0031 701/301 |
| 2008/0150404 A1* | 6/2008 | Ono | ......................... | B25H 1/20 312/209 |
| 2008/0289544 A1* | 11/2008 | Buitmann | ................ | A47B 9/00 108/20 |
| 2014/0020606 A1* | 1/2014 | Benden | .................. | A47B 97/00 108/50.14 |
| 2014/0096706 A1* | 4/2014 | Labrosse | ................... | F16L 3/01 108/21 |
| 2015/0368082 A1* | 12/2015 | Davis | .................... | B66F 11/042 701/50 |
| 2016/0309889 A1* | 10/2016 | Lin | .......................... | A47B 9/00 |
| 2017/0000254 A1* | 1/2017 | Matlin | ...................... | A47B 9/02 |
| 2017/0135587 A1* | 5/2017 | Desroches | .......... | A61B 5/14551 |
| 2018/0031441 A1* | 2/2018 | Wong | ..................... | H01H 13/14 |

(Continued)

*Primary Examiner* — Jose V Chen
(74) *Attorney, Agent, or Firm* — W&K IP

(57) ABSTRACT

The present disclosure relates to the field of office furniture, and more particularly to an electric lift table control system and method that realize a resistance back-off. The system comprises a controller, a table (1) and a lifting column (2) for driving the table to move vertically, the lifting column (2) is connected with the controller signal, and further comprises at least one arranged under the table (1) a safety grating (3) for detecting obstacles, each set of safety gratings comprising a transmitting end assembly and a receiving end assembly, and a gap is provided between the safety grating (3) and the lower surface of the table (1), and said The safety light barrier (3) is connected to the controller signal. This will control the lifting column to stop working before encountering obstacles.

8 Claims, 7 Drawing Sheets

(56) References Cited

U.S. PATENT DOCUMENTS

| | | | |
|---|---|---|---|
| 2018/0279770 A1* | 10/2018 | Crowe | A47B 9/10 |
| 2019/0082823 A1* | 3/2019 | Applegate | A47B 9/00 |
| 2019/0199349 A1* | 6/2019 | Lukas | H03K 17/965 |
| 2019/0223586 A1* | 7/2019 | Hansen | A47B 9/00 |
| 2020/0146440 A1* | 5/2020 | Fogarty | A47B 13/06 |
| 2020/0178682 A1* | 6/2020 | Deng | A47B 9/04 |
| 2020/0187831 A1* | 6/2020 | Panneer Selvam | A61B 5/1116 |
| 2021/0011453 A1* | 1/2021 | Xiang | G05B 19/402 |

\* cited by examiner

ELECTRIC LIFT TABLE CONTROL SYSTEM AND METHOD FOR RESISTANCE BACK-OFF

CROSS-REFERENCE TO RELATED APPLICATIONS

This application claims priority to Chinese Patent Application No. 201910313288.0 with a filing date of Apr. 18, 2019. The content of the aforementioned application, including any intervening amendments thereto, is incorporated herein by reference.

TECHNICAL FIELD

The present disclosure relates to the field of office furniture, and more particularly to an electric lift table control system and method that realize a resistance back-off.

BACKGROUND

Electric lifting platforms are commonly used in residential, office and medical applications, such as height-adjustable desks, dining tables, tatami, desks, medical beds, and more. When a user is adjusting the lifting platform, if the lifting platform or its frame encounters an obstacle, it may damage the obstacle or the structure of the platform itself. If the collision hits a human body, a personal injury may occur.

Therefore, there is a lifting platform with a resistance back-off function in the prior art. Such a lifting platform may judge whether a resistance has occurred after encountering an obstacle, and then perform a retracting operation. When the process takes a long period time, there may still be cases where the obstacle or the structure of the platform itself or even a human body gets damaged

SUMMARY

The technical problem to be solved by the present disclosure is to provide an electric lifting table control system that realizes a resistance back-off, so that the lifting column can be stopped before the obstacle is encountered.

One technical solution of the present disclosure is an electric lift table control system that realizes a resistance back-off, comprising a controller, a table, and a lifting column that is in signaling connection with the controller and drives the table to move vertically. The system further comprises at least one set of safety gratings arranged under the table for detecting obstacles, and each set of the safety gratings comprises a transmitting end assembly and a receiving end assembly. A gap is provided between the safety gratings and the lower surface of the table. The safety gratings are in signaling connection with the controller.

In an embodiment, a first mounting plate is arranged under each side of the table respectively. The transmitting end assembly and the receiving end assembly of the safety grating are respectively arranged on the opposite end faces of the two first mounting plates so that the beam emitted by the transmitting end assembly in the safety grating can be received by the receiving end assembly.

In an embodiment, a second mounting plate is arranged inside the side of each lifting column. The transmitting end assembly and the receiving end assembly of the safety grating are respectively arranged on the opposite end faces of the two second mounting plates so that the beam emitted by the transmitting end assembly in the safety grating can be received by the receiving end assembly.

In an embodiment, the system further comprises a first connecting plate. The first connecting plate respectively connects the first mounting plate on each of the two sides of the table with the second mounting plate to form an integral fixing plate.

In an embodiment, two third mounting plates are disposed between the two lifting columns at the lower portion of the table. The transmitting end assembly and the receiving end assembly of the safety grating are respectively arranged on the opposite end faces of the two third mounting plates. The transmitting end assembly and the receiving end assembly of the safety grating are respectively mounted on one of the third mounting plates and one side of the table. The transmitting end assembly and the receiving end assembly of the safety grating are respectively mounted on the other one of the third mounting plates and the other side of the table, and all safety grating are in signaling connection with the controller.

In an embodiment, two fourth mounting plates are disposed on the outer side of the two lifting columns. The transmitting end assembly and the receiving end assembly of the safety grating are respectively mounted on one of the fourth mounting plates and one side of the table. The transmitting end assembly and the receiving end assembly of the safety grating are respectively mounted on the other one of the fourth mounting plates and the other side of the table.

In an embodiment, the system further comprises a second connecting plate. The second connecting plate respectively connects the third mounting plate on each of the two sides of the table with the fourth mounting plate to form an integral fixing plate.

In an embodiment, a touch sensor is disposed on the lower part of each of the mounting plates, and the touch sensor is in signaling connection with the controller.

In an embodiment, the gap ranges from 2 to 20 cm.

The following advantages are achieved compared to prior arts by the embodiment of the present disclosure: The safety grating are arranged to detect obstacles, so that the safety grating can detect the obstacle before it hits the obstacle. That information can be then fed back to the controller. The controller can control the lifting column to stop or retract. A resistance back-off is enabled which can greatly reduce the possibility of the table hitting obstacles.

When the width of the table is equal to the width of the lifting column, the mounting plate is placed on both sides of the table, and then a part of the mounting plate is arranged on the portion of the mounting plate which is blocked by the lifting column. A safety grating is arranged on the mounting plate, and the two mounting plates are connected by a connecting plate. This makes the process of assembly easier, but also provides a more complete light coverage of the safety grating.

When the table is wider than the width of the lifting column, the mounting plate is placed between the two lifting columns, so that a safety grating is arranged between the two mounting plates. Then a safety grating is also arranged between the mounting plate and the table, so that a more complete light coverage of the safety grating can be achieved.

A touch sensor is placed in the lower part of the mounting plate so that the only blind spot under the table is covered by the touch sensor.

The gap between the safety grating and the lower surface of the table is set to 2-20 cm, so that the distance between the safety grating and the lower surface of the table is large, and the controller has more reaction time and higher reliability.

Another technical solution of the present disclosure is a control method for an electric lift table control system that realizes a resistance back-off comprising the following steps: S1, detecting the state of the lift table at a time interval X, continuing detection if the lift table is in a stationary state, and jumping to the next step if the lift table is in a moving state; S2, operating the safety grating to detect whether an obstacle is in the grating area of the safety grating, continuing detection if no obstacle is in the grating area of the safety grating, and determining an obstacle exists and controlling the lifting column to stop operation or retract by the controller if an obstacle is in the grating area of the safety grating.

Compared with the prior art, the present disclosure has the following advantages: Because the obstacle is detected by the safety grating, the safety grating can detect the obstacle before hitting the obstacle. The information can be fed back to the controller. The controller can control the lifting column to stop or retract, and a resistance back-off function is realized which can greatly reduce the possibility of the table hitting obstacles.

Figure 1:
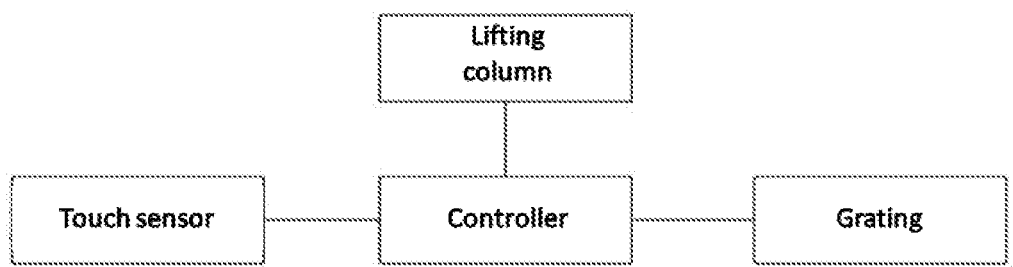
FIG. 1 is a block diagram showing the connection of an electric lift table control system that realizes resistance back-off in accordance with the present disclosure.
Figure 2:
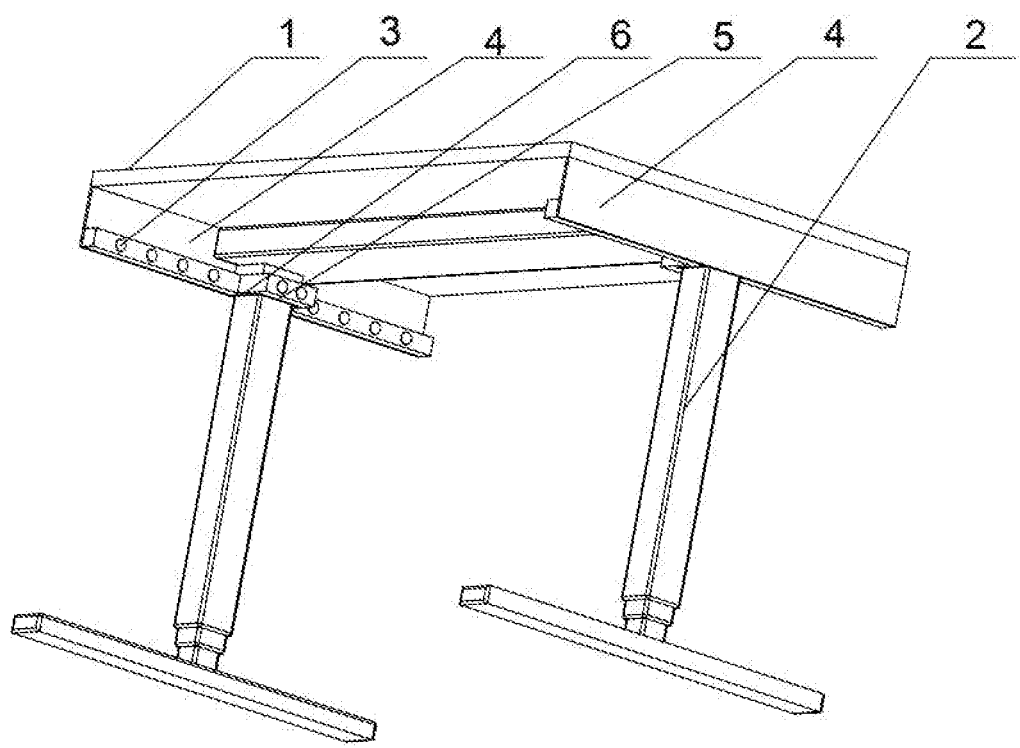
FIG. 2 is a schematic structural view of a third embodiment of the present disclosure.
Figure 3:
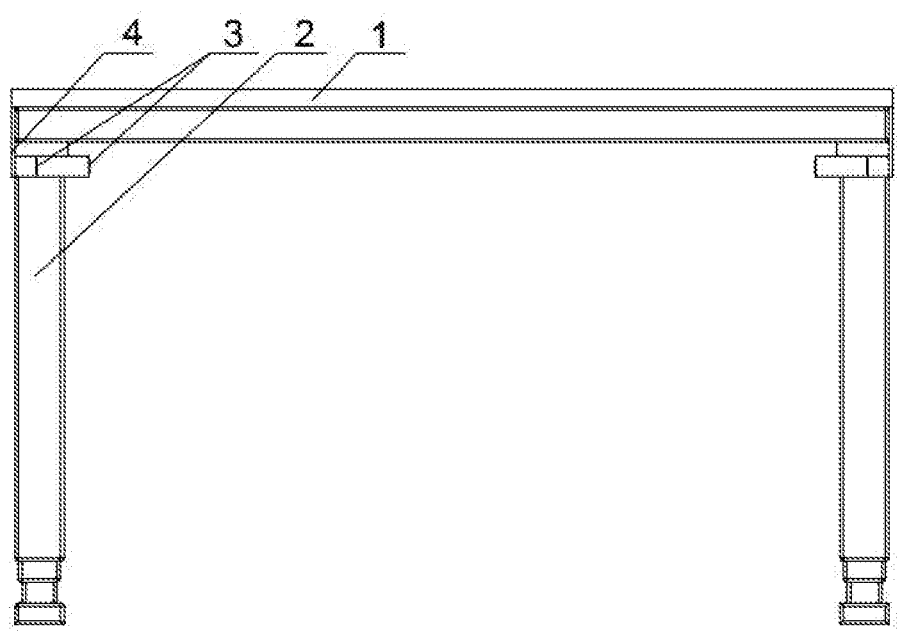
FIG. 3 is a side view of the third embodiment of the present disclosure.
Figure 4:
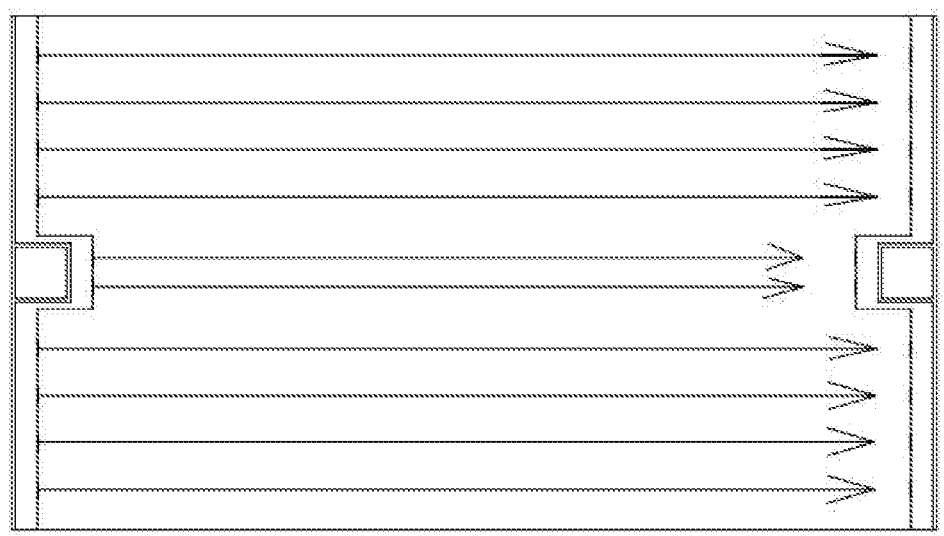
FIG. 4 is a schematic diagram of the operation of the safety grating in the third embodiment of the present disclosure.
Figure 5:
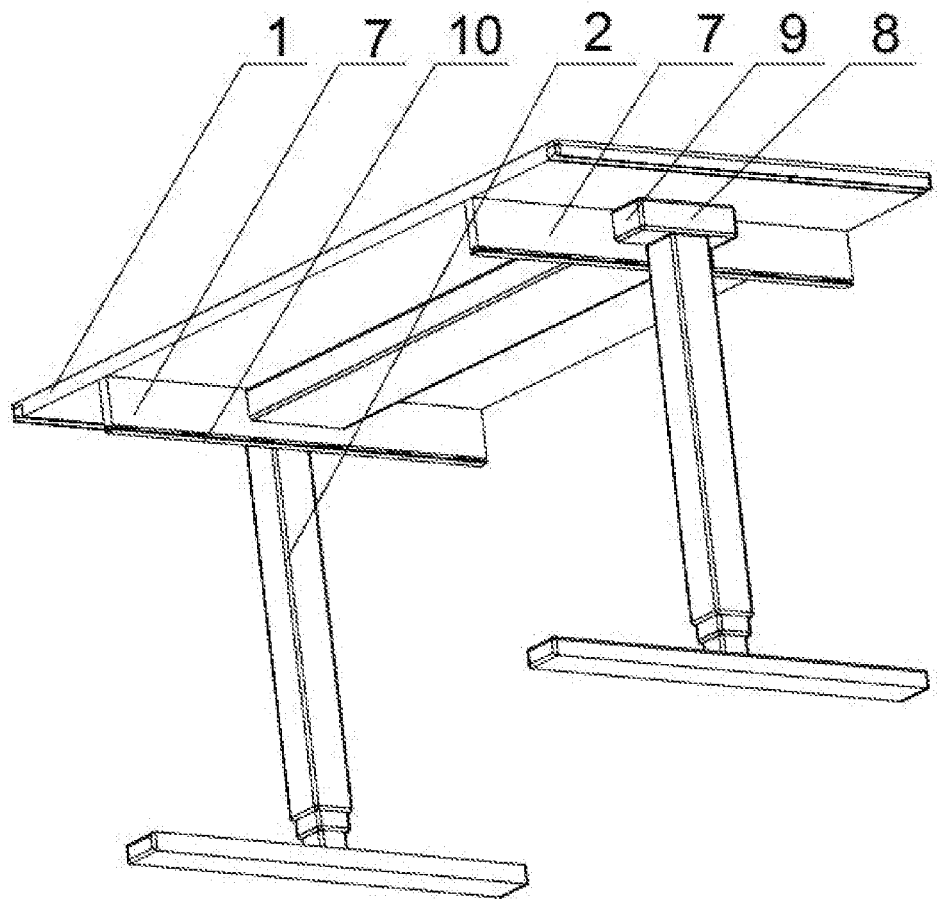
FIG. 5 is a schematic structural view of a ninth embodiment of the present disclosure.
Figure 6:
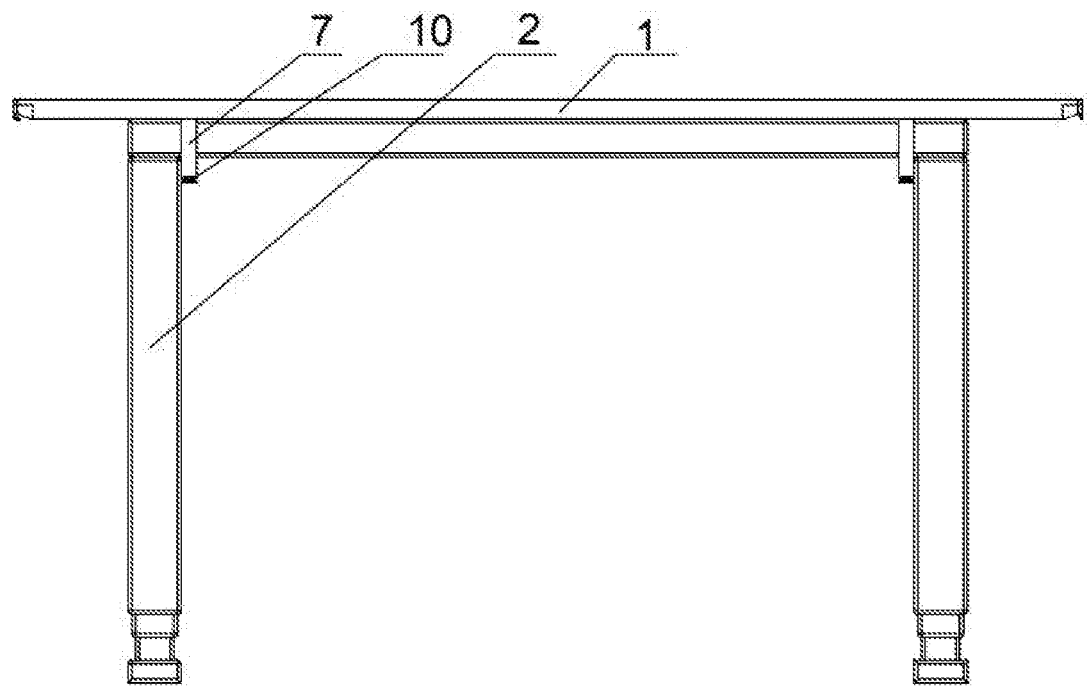
FIG. 6 is a side view of a ninth embodiment of the present disclosure.
Figure 7:
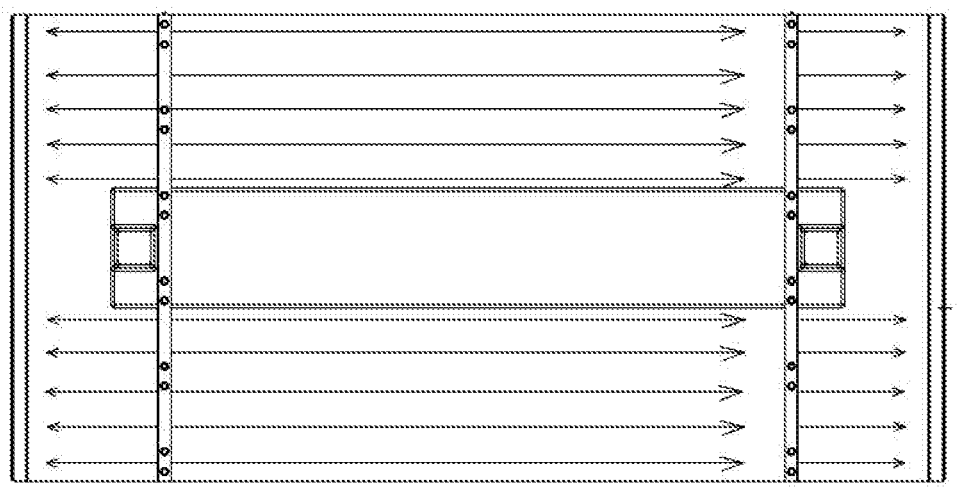
FIG. 7 is a schematic view showing the operation of the safety grating in the ninth embodiment of the present disclosure.

REFERNCE NUMBERS 1, table; 2, lifting column; 3, safety grating; 4, the first mounting plate; 5, the second mounting plate; 6, the first connecting plate; 7, the third mounting plate; The fourth mounting plate; 9, the second connecting plate; 10, the touch sensor.

DETAILED DESCRIPTION

The disclosure is further described below by way of specific embodiments, but the disclosure is not limited to the following specific embodiments.

The existing lifting table comprises a controller, a table 1, a base and a lifting column 2 arranged between the table and the base for adjusting the distance between the two. The lifting column and the controller may be in wired or wireless connection. The lifting column 2 generally comprises a power mechanism for driving the lifting column 2 which is usually a motor. The lifting column 2 comprises an outer casing fixed to the table 1 and an inner casing fixed to the base. The outer casing and the inner casing can move relative to each other. Because the lifting table is conventional in the prior art, it is not described in detail herein.

Besides, the safety grating 3 is a commercially available product, which is also conventional in the prior art. However, the safety grating of the prior art is mostly used to prevent the user's body from entering a dangerous area as a safety protection, and function as an error correction for detecting the size of position of a product. Herein the application is mainly installed on the lifting table to detect obstacles. A set of safety gratings 3 generally include a transmitting end assembly and a receiving end assembly. A plurality of transmitters are generally provided on the transmitting end assembly. The receiving end assembly also correspondingly comprises a plurality of receivers, and the safety grating generally needs to be connected with the controller.

Embodiment 1: The table 1 has a small width, which is equivalent to the width of the two lifting columns 2, so that the first mounting plate 4 is provided at the bottom ends of the table 1. The width of the first mounting plate 4 can be customized according to user requirements. The width may be half of the width of the table 1 or the same width as the table 1. The width can be changed according to the environment in which the lifting table is placed and the usage habit. The first mounting plate 4 is vertically arranged to the table 1. One side of the first mounting plate 4 is provided with a transmitting end assembly, and the other side of the first mounting plate 4 is provided with a receiving end assembly. That is, as long as the light emitted by the transmitting end assembly is received by the receiving end assembly, the positions of the two can be taken for corresponding, and the distance between the transmitting end assembly, the receiving end assembly and the lower surface of the table 1 is 2-20 cm. In the specific embodiment the distance is preferably 10 cm. In the specific embodiment, the light emitted by the transmitting end assembly is horizontal, so that the light received by the receiving end assembly is also horizontal. That is, the two assemblies can be arranged at the same height. When there is no obstacle, the optical signal emitted by the transmitting end assembly can be received by the receiving end assembly. When there is an obstacle, some of the light emitted by the transmitting end assembly is blocked by the obstacle, and the receiving end assembly corresponding to this part cannot receive the blocked part of the light, thereby detecting an obstacle in a certain area.

Embodiment 2: The second embodiment differs from the first embodiment in that, a part of the first mounting plate 4 is blocked by the lifting column 2. The part in which the first mounting plate 4 is blocked in the second embodiment would not comprise the transmitting end assembly or the receiving end assembly. Instead, the second mounting plate 5 is disposed on the opposite side of the side of the lifting column 2 that blocks the first mounting plate 4, and then the transmitting end assembly and the receiving end assembly are disposed at opposite positions of the two second mounting plates 5.

Embodiment 3: The third embodiment differs from the second embodiment in that the first mounting plate 4 and the second mounting plate 5 on each side of the table 1 of the third embodiment are fixedly connected by the first connecting plate 6 to form a fixing plate. When installing, one can install the fixing plate directly without having, to install multiple times.

Embodiment 4: The fourth embodiment differs from the third embodiment in that a touch sensor 10 is disposed on the bottom of the first mounting plate 4 and the second mounting plate 5 in the fourth embodiment. The touch sensor 10 is in signaling connection with the controller. The specific arrangement thereof can be determined according to needs. The touch sensor 10 can be a conventional sensor which generates a trigger signal when touched, and it is not described in detail here.

Embodiment 5: The fifth embodiment differs from the fourth embodiment in that the grating used in the fifth embodiment is an opposite grating, that is, the transmitting end component is spaced apart from the receiving end component, or a transmitting end component emits more than one beam of light. It is possible to emit multiple beams of light and then the beams can be received by multiple receiver components.

Embodiment 6: The width of the table 1 is larger than the width of the two lifting columns 2, so a third mounting plate 7 is disposed on the inner side of the two lifting columns 2. The third mounting plate 7 can be fixed on the lifting column 2 or under the table 1 on the top. The third mounting plate 7 is arranged perpendicular to the table 1, and the transmitting end assembly and the receiving end assembly of the safety grating are respectively arranged on the opposite end faces of the two third mounting plates. Since the safety grating 3 is disposed between the two third mounting plates 7, it can be horizontally disposed. The transmitting end assembly and the receiving end assembly of the safety grating are respectively mounted on one of the third mounting plates and one side of the table. Because there is a height difference between the side of the table 1 and the bottom of the third mounting plate 7, the safety gratings 3 need to be inclined. Therefore, the light emitted by the transmitting end assembly is inclined on this end. The transmitting end assembly and the receiving end assembly of the safety grating are also respectively mounted on the other one of the third mounting plates and the other side of the table. Because the height difference between the other side of the table 1 and the bottom of the third mounting plate 7, the light emitted by the transmitting end assembly is also inclined on this end. But the transmitting end assembly and the receiving end assembly and can be provided on either side according to user requirements.

Embodiment 7: The seventh embodiment differs from the sixth embodiment in that, since a part of the third mounting plate 7 is blocked by the lifting column 2, it is necessary to provide a fourth mounting plate 8 outside the two lifting columns 2. The safety grating 3 on the part of third mounting plate 7 blocked by the lifting column 2 which should be mounted on the third mounting plate 7 is mounted on the corresponding fourth mounting plate 8 instead. The transmitting end assembly and the receiving end assembly and can be provided on either part according to user requirements.

Embodiment 8: The eighth embodiment differs from the seventh embodiment in that the third mounting plate 7 and the fourth mounting plate 8 on each side of the table 1 in the specific embodiment 8 are fixedly connected by the second connecting plate 9 to form a fixing plate. When installing, the fixing plate can be directly mounted without having to install different components for multiple times.

Embodiment 9: The specific embodiment 9 is different from the eighth embodiment in that the touch sensor 10 can be disposed on the bottom of the third mounting plate 7 and the fourth mounting plate 8 of the ninth embodiment, and the touch sensor 10 is connected to the controller. The specific configuration can be changed as needed. The touch sensor 10 is a conventional sensor. A trigger signal can be generated when the touch sensor 10 is touched. It is not described in detail here.

Embodiment 10: The specific embodiment 10 differs from the specific embodiment 9 in that the lower part of the table 1 of the specific tenth embodiment is provided with a mounting member, so that the safety grating 3 which should be installed directly on both sides of the table 1 can be mounted on the mounting member instead. The distance between the safety grating 3 and the table 1 is increased.

Moreover, the above embodiments can be controlled by the following control method:

S1: The method starts with detecting the state of the lift table at a time interval X. Detection is continue if the lift table is in a stationary state, and the method jumps to the next step if the lift table is in a moving state.

S2: The method proceeds with operating the safety grating to detect whether an obstacle is in the grating area of the two corresponding safety gratings by emitting light with the transmitting end assembly and receiving light with the receiving end assembly. Detection is continued if no obstacle is in the grating area of the safety grating. An obstacle is determined to exist and the lifting column is controlled to stop operation or retract by the controller if an obstacle is determined to be in the grating area of the safety grating.

Moreover, if the lifting table of the fourth embodiment or the ninth embodiment is used, the touch sensor also needs to work simultaneously while the grating is working. The area covered by the safety grating is the area between each set of safety gratings, but the mounting plate itself may not be covered. Therefore, the installation of the touch sensor under the mounting plate eliminates a dead zone of the resistance back-off of the table.

The specific object of the present disclosure is that because the lifting table is easy to encounter obstacles during work, it may damage the obstacle or the structure of the platform itself, and might even cause damage to the human body. It is therefore desired that the lifting table will be stopped or retracted before encountering the obstacle. Because the safety grating generates a grating area, it can also become a detection area, that is, the transmitter in the transmitting end assembly of the safety grating emits light, and then the light is received by the receiver on the receiving end assembly. The light coverage area would be the detection area. When there is an obstacle in the detection area, the safety grating can detect it and then send a signal to the controller. After that the controller controls the lifting column to stop or retract, and the table stops or retracts before it encounters the obstacle. A certain gap needs to be left between the detection area of the safety grating and the lower surface of the table. In the specific embodiment of the present disclosure, a range of 2-20 cm is provided to give a period of time for the reaction of the controller. When the detection area detects an obstacle, it takes the signal some buffering time before it can be transmitted to the controller and the controller can control the lifting column to stop. The buffering gap is provided for this reason. However, the length of this buffering gap may vary primarily according to the lifting speed of the corresponding lifting column and the reaction time of the controller, and it can be determined based on actual requirements.

It should be noted that the above embodiments are only for explaining the technical solutions of the present disclosure, and are not intended to be limiting. Although the present disclosure has been described in detail with reference to the foregoing embodiments, those skilled in the art will understand that the technical solutions described in the foregoing embodiments can be modified, or some of the technical features can be replaced by the same, and the modifications and substitutions do not depart from the spirit and scope of the technical solutions of the embodiments of the present disclosure.

I claim:

1. An electric lift table control system that realizes a resistance back-off, comprising a controller, a table (1), and a lifting column (2) that is in signaling connection with the controller and drives the table to move vertically, wherein the system further comprises two safety gratings (3) arranged under the table (1), wherein one safety grating (3) comprises a transmitting end assembly, and the other safety grating comprises a receiving end assembly, each set of the safety gratings comprising a transmitting end assembly and a receiving end assembly, wherein when the transmitting end assembly emits an optical signal, the receiving end assembly receives the emitted optical signal, wherein when the optical signal emitted by the transmitting end assembly is blocked by an obstacle, the receiving end assembly cannot receive the blocked part of the optical signal, thereby detecting the obstacle, wherein a gap is provided between the safety gratings (3) and the lower surface of the table (1), wherein the safety gratings (3) are in signaling connection with the controller, wherein a first mounting plate (4) is arranged under each side of the table (1) respectively, and wherein the transmitting end assembly and the receiving end assembly are respectively arranged on the opposite end faces of the two first mounting plates (4) so that the optical signal emitted by the transmitting end assembly can be received by the receiving end assembly.

2. The electric lift table control system according to claim 1, wherein a second mounting plate (5) is arranged inside the side of each lifting column (2), and wherein the transmitting end assembly and the receiving end assembly are respectively arranged on the opposite end faces of the two second mounting plates (5) so that the optical signal emitted by the transmitting end assembly can be received by the receiving end assembly.

3. The electric lift table control system according to claim 2, further comprising a connecting plate (6), wherein the connecting plate (6) respectively connects the first mounting plate (4) on each of the two sides of the table (1) with the second mounting plate (5) to form an integral fixing plate.

4. The electric lift table control system according to claim 3, wherein a touch sensor (10) is disposed on the lower part of each of the mounting plates, and wherein the touch sensor (10) is in signaling connection with the controller.

5. An electric lift table control system that realizes a resistance back-off, comprising a controller, a table (1), and a lifting column (2) that is in signaling connection with the controller and drives the table to move vertically, wherein the system further comprises two safety gratings (3) arranged under the table (1), wherein one safety grating (3) comprises a transmitting end assembly, and the other safety grating comprises a receiving end assembly, each set of the safety gratings comprising a transmitting end assembly and a receiving end assembly, wherein when the transmitting end assembly emits an optical signal, the receiving end assembly receives the emitted optical signal, wherein when the optical signal emitted by the transmitting end assembly is blocked by an obstacle, the receiving end assembly cannot receive the blocked part of the optical signal, thereby detecting the obstacle, wherein a gap is provided between the safety gratings (3) and the lower surface of the table (1), wherein the safety gratings (3) are in signaling connection with the controller, wherein two mounting plates (7) are disposed between the two lifting columns (2) at the lower portion of the table (1), wherein the transmitting end assembly and the receiving end assembly are respectively arranged on the opposite end faces of the two mounting plates (7), wherein the transmitting end assembly and the receiving end assembly are respectively mounted on one of the two mounting plates (7) and one side of the table (1), wherein the transmitting end assembly and the receiving end assembly are respectively mounted on the other one of the two mounting plates (7) and the other side of the table (1), and wherein the safety grating (3) are in signaling connection with the controller.

6. An electric lift table control system that realizes a resistance back-off, comprising a controller, a table (1), and a lifting column (2) that is in signaling connection with the controller and drives the table to move vertically, wherein the system further comprises two safety gratings (3) arranged under the table (1), wherein one safety grating (3) comprises a transmitting end assembly, and the other safety grating comprises a receiving end assembly, each set of the safety gratings comprising a transmitting end assembly and a receiving end assembly, wherein when the transmitting end assembly emits an optical signal, the receiving end assembly receives the emitted optical signal, wherein when the optical signal emitted by the transmitting end assembly is blocked by an obstacle, the receiving end assembly cannot receive the blocked part of the optical signal, thereby detecting the obstacle, wherein a gap is provided between the safety gratings (3) and the lower surface of the table (1), wherein the safety gratings (3) are in signaling connection with the controller, wherein two mounting plates (8) are disposed on the outer side of the two lifting columns (2), wherein the transmitting end assembly and the receiving end assembly are respectively mounted on one of the two mounting plates (8) and one side of the table (1), and wherein the transmitting end assembly and the receiving end assembly are respectively mounted on the other one of the two mounting plates (8) and the other side of the table (1).

7. The electric lift table control system according to claim 6, further comprising a third mounting plate (7) and a-connecting plate (9), wherein the connecting plate (9) respectively connects the third mounting plate (7) on each of the two sides of the table (1) with the two mounting plates (8) to form an integral fixing plate.

8. The electric lift table control system according to claim 1, wherein the gap ranges from 2 to 20 cm.

* * * * *